United States Patent
Richter et al.

(10) Patent No.: US 7,316,305 B2
(45) Date of Patent: Jan. 8, 2008

(54) FLOW THROUGH ARTICLE STORAGE DEVICE

(75) Inventors: Thomas Scott Richter, Wauseon, OH (US); Rodger Andrew Goodrow, Hudson, MI (US)

(73) Assignee: Adrian Steel Co., Adrian, MI (US)

( * ) Notice: Subject to any disclaimer, the term of this patent is extended or adjusted under 35 U.S.C. 154(b) by 0 days.

(21) Appl. No.: 11/438,943

(22) Filed: May 23, 2006

(65) Prior Publication Data

US 2007/0007101 A1 Jan. 11, 2007

Related U.S. Application Data

(60) Provisional application No. 60/683,560, filed on May 23, 2005.

(51) Int. Cl.
*B65G 13/00* (2006.01)
(52) U.S. Cl. ............... 193/35 A; 193/35 G; 193/35 R
(58) Field of Classification Search ............... 198/530, 198/532; 193/35 A, 35 G, 40, 35 R; 211/151
See application file for complete search history.

(56) References Cited

U.S. PATENT DOCUMENTS

| | | | | |
|---|---|---|---|---|
| 3,627,092 A | * | 12/1971 | Fleischauer | 193/35 A |
| 3,827,582 A | * | 8/1974 | Lederer | 414/798.5 |
| 3,881,585 A | * | 5/1975 | Coleman et al. | 193/35 A |
| 3,900,112 A | | 8/1975 | Azzi et al. | |
| 4,128,177 A | * | 12/1978 | Bustos | 211/59.2 |
| 4,168,780 A | | 9/1979 | Parrott | |
| 4,182,440 A | * | 1/1980 | Juergens | 193/35 A |
| 4,193,489 A | * | 3/1980 | Siniscal | 198/406 |
| 4,253,558 A | * | 3/1981 | Roeing et al. | 193/35 A |
| 4,341,313 A | * | 7/1982 | Doring | 211/151 |
| 4,349,114 A | | 9/1982 | Vickers et al. | |
| 4,372,451 A | | 2/1983 | Rasmussen et al. | |
| 4,383,598 A | * | 5/1983 | Newman | 193/35 A |
| 4,394,910 A | | 7/1983 | Miller | |
| 4,453,641 A | | 6/1984 | Rasmussen et al. | |
| 4,582,188 A | * | 4/1986 | Seiz et al. | 193/40 |
| 4,715,765 A | | 12/1987 | Agnoff | |
| 4,765,493 A | | 8/1988 | Kinney | |
| 4,907,686 A | * | 3/1990 | Cotic | 193/45 |
| 5,115,920 A | | 5/1992 | Tipton et al. | |
| 5,123,517 A | * | 6/1992 | Windau | 198/463.3 |
| 5,197,610 A | * | 3/1993 | Bustos | 211/59.2 |
| 5,259,518 A | | 11/1993 | Sorenson et al. | |

(Continued)

*Primary Examiner*—Douglas A Hess
(74) *Attorney, Agent, or Firm*—Butzel Long (57) ABSTRACT

A flow through article storage device that includes a housing into which a plurality of stacks of articles can be positioned. The housing has a bottom and a front and rear end. A plurality of elongate abutment elements are coupled to the housing and configured for independent movement between a first position in which the elongate abutment elements extend at least partially into the interior of the housing and a second position in which the elongate abutment members do not extend into the interior of the housing. At least one track of rollers is provided on the bottom or an inclined support surface of the housing. Stacks of articles that are loaded into the rear end of the housing are subsequently removed from the front end. The elongate abutment elements can be selectively moved between the first and second positions to control movement of the stacks of articles along the inclined bottom.

20 Claims, 6 Drawing Sheets

U.S. PATENT DOCUMENTS

| | | |
|---|---|---|
| 5,285,909 A | 2/1994 | Slater |
| 5,295,591 A | 3/1994 | Slater |
| 5,474,412 A | 12/1995 | Pfeiffer et al. |
| 5,490,587 A * | 2/1996 | Fisher ............... 193/35 A |
| 5,788,090 A | 8/1998 | Kajiwara |
| 5,887,732 A | 3/1999 | Zimmer et al. |
| 5,951,228 A | 9/1999 | Pfeiffer et al. |
| 6,073,743 A | 6/2000 | Mefford |
| 6,095,347 A | 8/2000 | Mauro-Vetter |
| 6,105,798 A | 8/2000 | Gruber et al. |
| 6,132,158 A | 10/2000 | Pfeiffer et al. |
| 6,186,725 B1 | 2/2001 | Konstant |
| 6,202,821 B1 * | 3/2001 | Crockett ............... 193/35 G |
| 6,230,908 B1 | 5/2001 | Sloan et al. |
| 6,409,026 B2 | 6/2002 | Watanabe |
| 6,431,808 B1 | 8/2002 | Lowrey et al. |
| 6,497,326 B1 | 12/2002 | Osawa |
| 6,513,667 B2 * | 2/2003 | Battaglia et al. ............ 211/59.2 |
| 6,640,953 B2 * | 11/2003 | Brouwer et al. .......... 193/35 A |
| 6,659,293 B1 * | 12/2003 | Smith .................. 211/59.2 |
| 2001/0017284 A1 | 8/2001 | Watanabe |
| 2002/0064441 A1 | 5/2002 | Lowrey et al. |

* cited by examiner

FLOW THROUGH ARTICLE STORAGE DEVICE

RELATED APPLICATION

The present application is based upon U.S. Provisional Patent Application Ser. No. 60/683,560, filed May 23, 2005 to which priority is claimed under 35 U.S.C. §120 and of which the entire specification is hereby expressly incorporated by reference.

TECHNICAL FIELD

The present invention relates to the storage and accessible supply of stackable articles contained in a multi-unit storage device. More particularly, the present invention relates to a multi-stack storage device which advances a subsequent stack of articles when a preceding stack of articles is depleted.

BACKGROUND ART

The need to provide access to stored articles and to provide an inventory of the articles is not so much of a problem in warehouses and other large scale storage facilities. However, in more limited-spaced storage facilities which handle a significant flow of inventory requiring constant replenishment of stored items, storage, accessibility and inventory control can become challenging.

U.S. Pat. No. 3,900,112 to Azzi et al., U.S. Pat. No. 4,168,780 to Parrott, U.S. Pat. No. 4,349,114 to Vickers et al., U.S. Pat. No. 4,394,910 to Miller, U.S. Pat. No. 4,372,451 to Rasmussen, et al., U.S. Pat. No. 4,453,641 to Rasmussen et al., U.S. Pat. No. 4,715,765 to Agnoff, U.S. Pat. No. 4,765,493 to Kinney, U.S. Pat. No. 5,115,920 to Tipton et al., U.S. Pat. No. 5,259,518 to Sorenson et al., U.S. Pat. No. 5,285,909 to Slater, U.S. Pat. No. 5,295,591 to Slater, U.S. Pat. No. 5,474,412 to Pfeiffer et al., U.S. Pat. No. 5,788,090 to Kajiwara, U.S. Pat. No. 5,887,732 to Zimmer et al., U.S. Pat. No. 5,951,228 to Pfeiffer et al., U.S. Pat. No. 6,073,743 to Mefford, U.S. Pat. No. 6,095,347 to Mauro-Vetter, U.S. Pat. No. 6,105,798 to Gruber et al., U.S. Pat. No. 6,132,158 to Pfeiffer et al., U.S. Pat. No. 6,186,725 to Konstant, U.S. Pat. No. 6,230,908 to Sloan et al., U.S. Pat. No. 6,409,026 to Watanabe, 6,431,808 to Lowrey et al., U.S. Pat. No. 6,497,326 to Osawa and United States Published Patent Application Nos. 2001/0017284 to Watanabe and 2002.0064441 to Lowrey et al. disclose various types and designs for gravity feed storage systems that are used to store and feed various types of articles.

Storage units for vehicles in the form of fixed and movable bins are known. However, inventory control of articles stored in such bins requires a user to physically handle and sort the articles in order to access older or early stored articles over newer or later stored articles. Such physical handling and sorting can be time consuming and can require repeated physical handling and moving of all remaining and new articles every time inventory is replenished. In addition, since articles stored in vehicles have to be contained in bins or secured in some other known matter, remaining articles may have to be removed from storage, replaced with new inventory and then restored each time inventory is replenished.

The present invention provides multi-stack storage device into which articles can be loaded and presented for access and removal in a manner that presents older stored articles for access and use before new stored articles.

DISCLOSURE OF THE INVENTION

According to various features, characteristics and embodiments of the present invention which will become apparent as the description thereof proceeds, the present invention provides a flow through article storage device that comprises:

a housing into which a plurality of stacks of articles can be positioned, said housing having a bottom and a front, rear and opposite sides;

a plurality of abutment elements that are coupled to the housing and configured for independent movement between a first position in which the abutment elements extend at least partially into the interior of the housing through the opposite sides and a second position in which the abutment members do not extend into the interior of the housing;

at least one track of rollers provided interiorly in the housing upon which stacks of articles positioned in the housing can move toward the front of the device under the influence of gravity; and means for moving the abutment elements between the first and second positions to control the movement of stacks of articles position in the housing.

The present invention further provides a method of controlling the transport of a plurality of articles to a supply site at which the articles can be distributed which comprises:

providing an inclined support along which the plurality of articles can move under the influence of gravity;

providing a plurality of blocking elements that can be selectively moved into and out blocking positions which extend over a portion of the inclined support;

arranging the plurality of articles in stacks on the inclined support; and manipulating the plurality of blocking elements so as to sequentially move the plurality of stacks of articles down the inclined support.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to a flow through article storage device that includes a housing or frame into which a plurality of stacks of articles can be positioned. The housing or frame includes an inclined article support which slopes downward from the rear of the device to the front to the front of the device. The inclined article support can be the actual bottom of the housing or frame in instances in which the actual bottom of the housing or frame is itself inclined. Alternatively, the article support can be a separate structure that extends above the actual bottom of the housing or frame. One or more tracks of rollers are provided on the inclined article support. Stacks of articles placed into the housing on the inclined article support will tend to move under the influence of gravity toward the front of the housing or frame where they can be removed. Articles to be stored within the housing or frame are loaded as stacks in the rear of the housing or frame. Abutment elements are provided along the sides of the housing or frame and are configured to be independently moveable between positions in which the elongate abutment elements extend at least partially into the interior of the housing or frame and positions in which the elongate abutment members do not extend into the interior of the housing or frame. Linkage mechanisms are provided that are coupled to the plurality of elongate abutment elements and extend to the front and rear of the housing or frame for manipulation and control of movement of the abutment elements.

Figure 1:
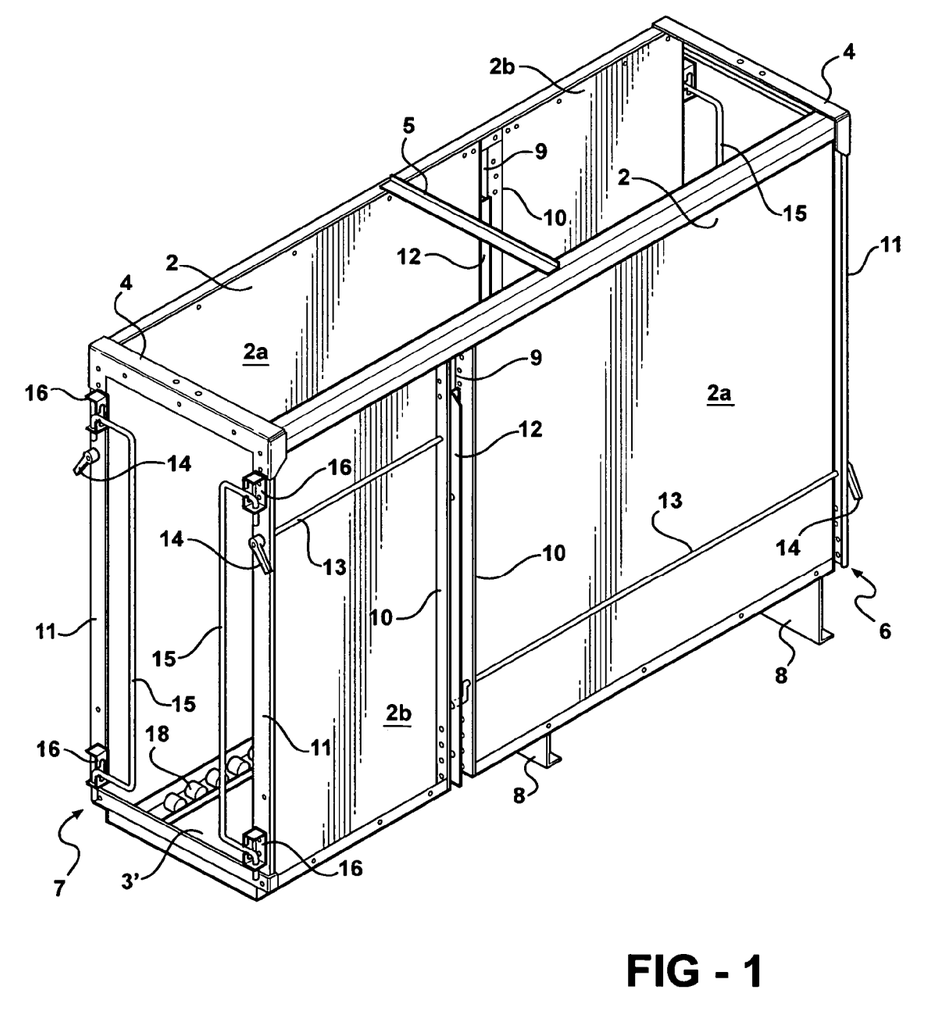
FIG. 1 is a prospective side view of a storage device according to one embodiment of the present invention.

FIG. 1 is a prospective side view of a storage device according to one embodiment of the present invention. The storage device includes a generally rectangular frame that supports opposed side panels 2 and a bottom panel 3. The generally rectangular framework includes a plurality of cross braces including cross braces 4 at the top edges of the device and one or more intermediate cross braces 5 at the top (one shown) and/or beneath the bottom of the device. It is to be understood that the overall rectangular frame which includes the side panels 2, bottom panel 3 and cross and immediate braces 4 and 5 is not limited to any particular construction so long as a general overall housing is provided. Such a housing can be made entirely from panel members or discrete frame elements or combinations thereof so long as the gaps or spaces 9, discussed below are provided. As used in the appended claims, the term "housing" encompasses a structure that is made entirely from panel members or discrete frame elements or combinations thereof.

The bottom 3' of the device is inclined so as to slope downward from the rear 6 of the device to the front 7. The device is supported on a plurality of legs 8 which, as shown can extend across the width of the bottom 3' to provide support. The legs 8, as shown, progressively decrease in height from the rear 6 of the device to the front 7 so as to compensate for the angle of inclination or slope of the bottom 3'. In an alternative embodiment, the bottom 3' shown in FIG. 1 can be substantially flat, and an inclined article support can be provided which extends over the substantially flat bottom. In such an embodiment, the housing or frame can rest on the substantially flat bottom with or without any type of leg structure.

Each of the opposed side panels 2 includes two side panel sections 2a, 2b that extend from the rear and front ends 6, 7 of the device to positions that divide the device approximately into thirds lengthwise. The side panel sections 2a, 2b are spaced apart from one another so as to provide an elongate gap or space 9 therebetween. The edges of the side panel sections 2a, 2b adjacent the gap or space 9 are bend outward to form narrow perpendicular intermediate walls 10 that extend outward from the otherwise planar surfaces of the side panel sections 2a, 2b. Likewise, the opposed ends of the side panel sections 2a, 2b are bend outward to form narrow perpendicular end walls 11 that extend outward from the otherwise planar surfaces of the side panel sections 2a, 2b.

An elongate stop rail 12 is provided in the gap or space 9 between the adjacent side panels 2a, 2b. The stop rails 12 are coupled to a linkage mechanism that can be manually operated to selectively move the stop rails 12 between a position in which they extend into the interior of the device and a position in which they do not extend into the interior of the device. According to one embodiment of the present invention, the linkage mechanism that is used to manually move the stop rails 12 includes rod members 13 which extend between and through and are supported by the perpendicular intermediate walls 10 and the perpendicular end walls 11. The ends of the rod members 13 which extend through the intermediate perpendicular walls 10 have reversed right angle bends which form crank-shape portions. The terminal ends of the crank-shaped portions extend into through-holes provided in the stop rails 12 (See FIG. 1) and can be secured therein using a washer/cotter key, press-fit cap, snap ring, or other retainer or retaining means or assemblies. The opposite ends of the rod members 13 which extend through the perpendicular end walls 11 are provided with handles 14 which can be manually rotated to thereby rotate the straight central portions of the rod members 13 that are supposed between and in the perpendicular intermediate and end walls 10, 11. As the rod members 13 are rotated, the crank-shape ends of the rod members 13 rotate the stop rails 12 between a position in which they extend into the interior of the device and a position in which they do not extend into the interior of the device. As can be understood, selective rotation of one handle 14 on one side of the device will cause the stop rail 12 on the same side of the device to be positioned so as to extend into the interior of the device or to be positioned so as not to extend into the interior of the device. At the same time, movement of the stop rail 12 will cause the other rod member 13 (and associated handle 14) on the same side but opposite end of the device to rotate. As can be understood, this arrangement allows for selective control and positioning of the stop rails 12 from either the front 7 or rear 6 of the device.

The front 7 and rear 6 of the device is generally open and each includes a gate assembly. The gate assembly preferably includes one or more pivotal gates. In the embodiment shown, pivot rods 15 are pivotally mounted at the rear and front ends 6, 7 of the device and configured so that when pivoted into their closed position, intermediate portions of the pivot rods which are parallel to one another extend across the openings at the front and rear 7, 6 of the device and retain articles from coming out of the device. The ends of the pivot rods 15 can be supported in pivot brackets 16 that are provided with a recess or catch that holds the pivot rods 15 in their closed positions. The pivot brackets 16 are configured so that the pivot rods 15 have to be lifted upwards before they can clear a slot 20 provided in the pivot brackets 16 and be pivoted into their open positions.

The use of the gate assemblies discussed above allows visual inspection and observation of the contents of the device, i.e. the stacked articles. In alternative embodiments any type of convenient closure can be used including pivoting, sliding or roll up doors, removable panels, etc. In addition other types of gate or barrier structures can be used including for example removable rather than pivotal gate assemblies. As used in the appended claims, the term "closure" encompasses gates, doors, panels as mentioned herein.

The bottom 3' (or article support) of the device is provided with one or more tracks of rollers 18 which will allow articles stacked or placed in the device to move under the influence of gravity from the rear 6 to the front 7 of the device along the sloped or inclined bottom 3'.

Figure 2:
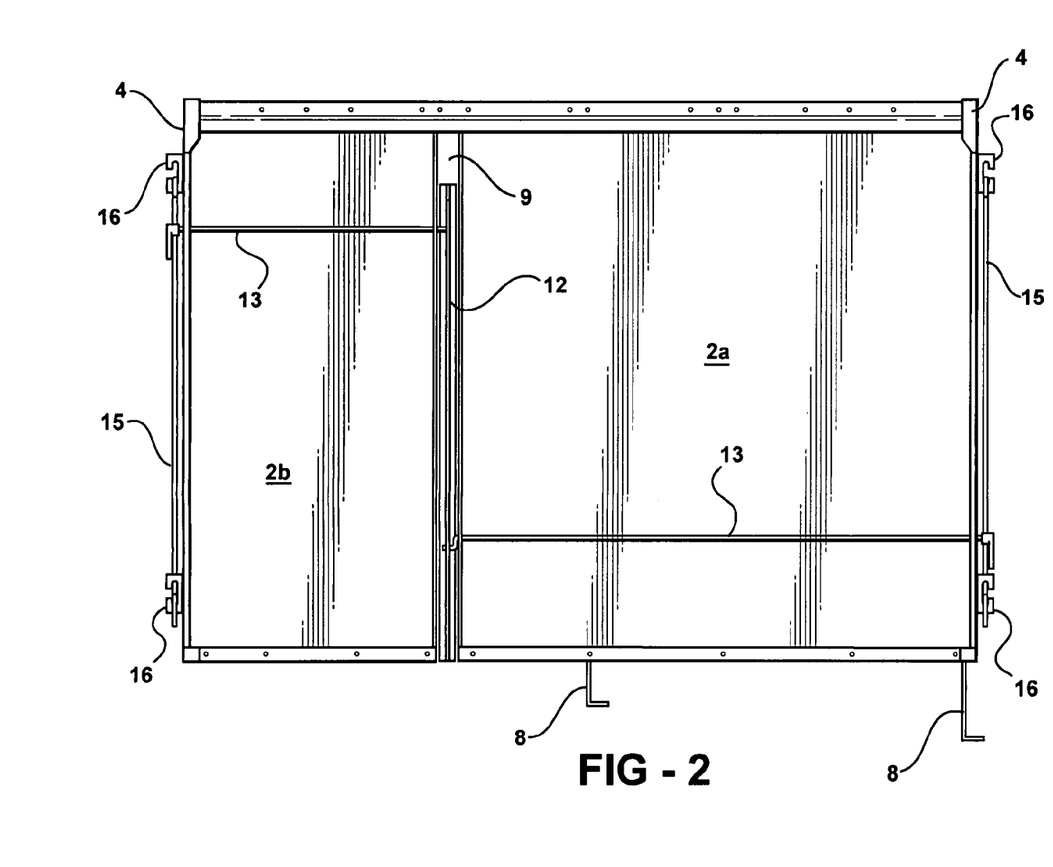
FIG. 2 is a planar side view of the storage device of FIG. 1.

FIG. 2 is a planar side view of the storage device of FIG. 1. FIG. 2 best shows how the rod members 13 includes straight central portions that extend between and through the perpendicular intermediate and end side walls 10 and 11 so that the rod members 13 can rotate about the central axis that extends through the straight central portions while being supported by the perpendicular intermediate and end side walls 10 and 11. In the embodiment of the invention depicted in FIG. 2 the device is configured to store three stacks of articles. Therefore the stop rails 12 (one shown) are spaced so as to divide the device substantially into thirds (See FIG. 1) with the stop rails 12 being provided on opposite sides of the device. Because of the position of the stop rails 12, in FIG. 2 the forward extending rod member 13 is shorter than the rearward extending rod member 13. In FIG. 2 the pivot brackets 16 are shown as extending outward from the front 7 and rear 6 ends of the device.

Figure 3:
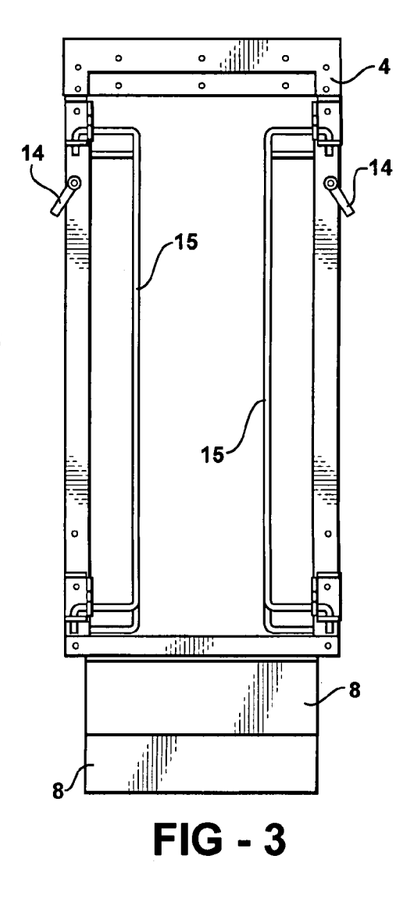
FIG. 3 is a planar front view of the storage device of FIG. 1.

FIG. 3 is a planar front view of the storage device of FIG. 1. In FIG. 3 the pivot rods 15 are depicted in their closed position. In general, the device is designed to hold a plurality of stacks of articles such as, for example, boxes, cartons, containers that are rectangular. In order to secure the articles in stacks, the inner dimensions of the device is preferably slightly larger than the dimensions of the articles. That is, the inner width of the device is preferably slightly greater than the width of the articles and the stop rails 12 are preferably spaced apart from one another and from the front and rear ends 7, 6 of the device a distance that is slightly greater than the lengths of the articles. In general, when the device is full of stacked positioning the stop rails 12 so that they extend into the device will help support the stacks, should an adjacent stack be removed or partially removed. As can be seen in FIG. 3, the pivot rods 15 of the gate assembly extend across a sufficient portion of the openings at the front 7 and rear 6 of the device when they are in their closed positions to prevent articles from coming out of the device.

Figure 4:
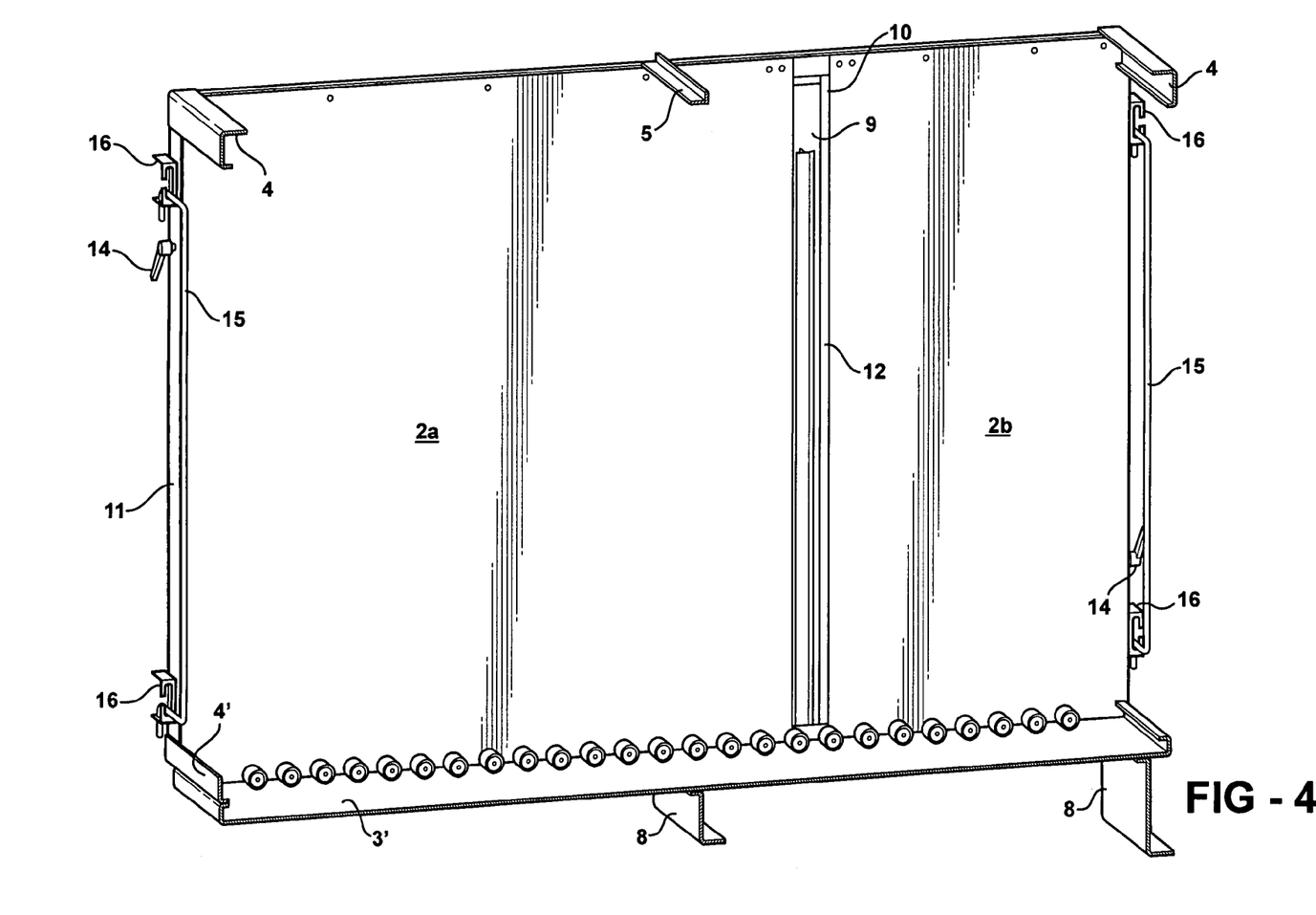
FIG. 4 is cut-away inner side view of one side of the storage device of FIG. 1.

FIG. 4 is cut-away inner side view of one side of the storage device of FIG. 1. FIG. 4 shows one of two tracks of rollers 18 (absent the track that holds the rollers—See FIG. 1). FIG. 4 also depicts a stop rail 12 that, as shown comprises two elongate portions that are coupled together to provide a bumper or abutment against which stacks of articles are restrained when the stop rail 12 is positioned so that it extends into the device. Further details of the stop rails 12 will be discussed below. FIG. 4 also depicts the cross braces 4, 5 and one manner in which the bottom 3' of the device can be formed at the front 7 and rear 6 ends of the device to provide structural strength. In addition, there is a lower cross brace 4' attached at the front 7 of the device that prevents articles or stacks of articles from falling out of the device when the pivot rods 15 are open at the front 7 of the device. FIG. 4 further depicts one manner in which the legs 8 can be constructed and attached to the bottom 3' of the device. In an alternative embodiment, legs for the device can be attached to the sides and/or ends and extend downward beyond the bottom 3'. As noted above, when the bottom 3' is substantially flat and a separate inclined article support is provided that extends over the substantially flat bottom, the device can rest directly on the substantially flat bottom with or without any leg structures.

Figure 5:
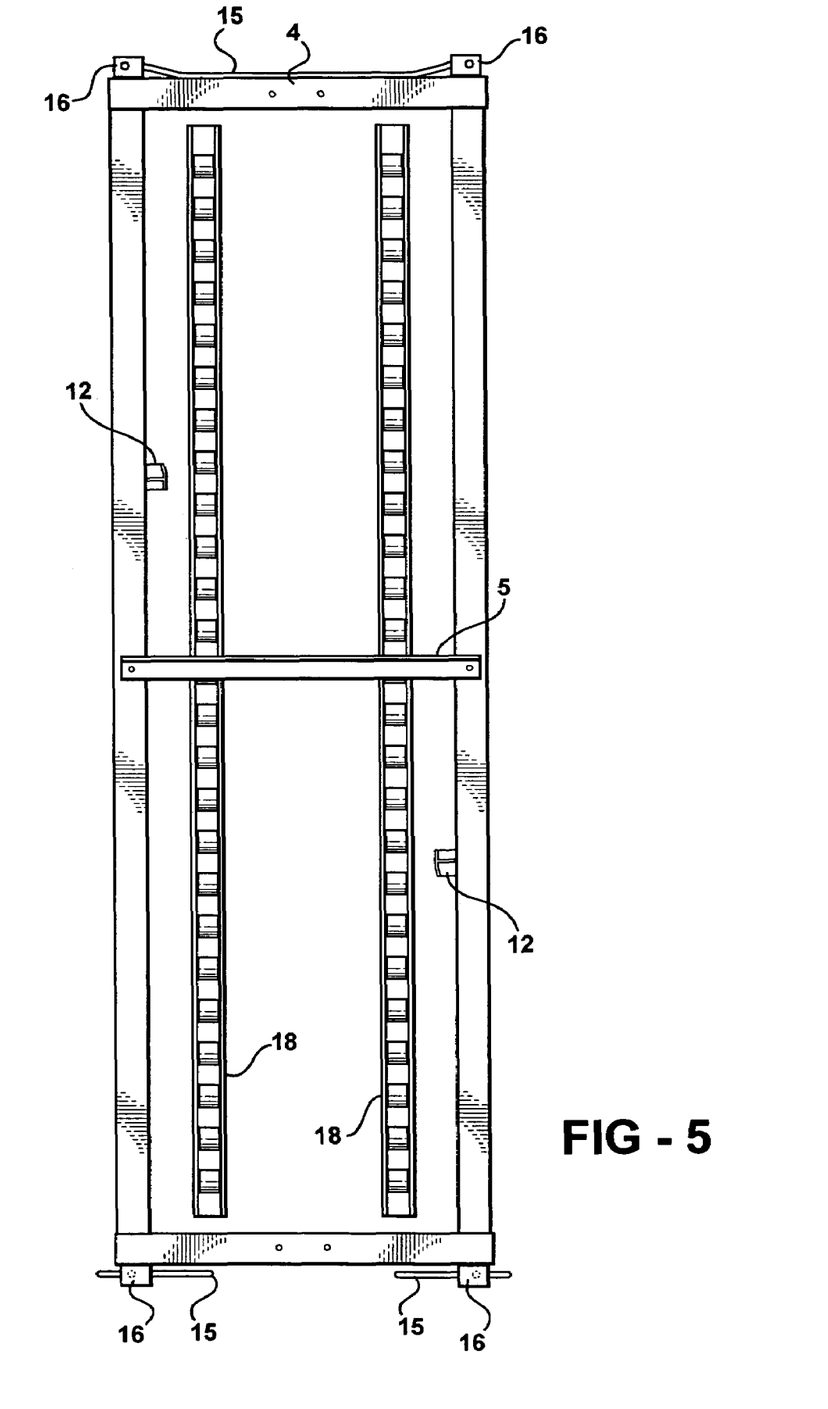
FIG. 5 is a planar top view of the storage device of FIG. 1.

FIG. 5 is a planar top view of the storage device of FIG. 1. FIG. 5 depicts an arrangement in which each of the stop rails 12 extend into the interior of the device. In this configuration stacks of articles will be separated and restrained from moving forward under the influence of gravity by the stop rails 12. It is to be understood that each of the stop rails 12 can be independently moved and positioned so as to extend into the device or not extend into the device. This allows a particular use of the device for flow through article dispensing as discussed in more detail below. FIG. 5 also depicts the tracks of rollers 18 that are provided on the bottom 3' of the device to allow stacks of articles to move under the influence of gravity from the rear 6 to the front 7 of the device along the sloped or inclined bottom 3'.

Figure 6:
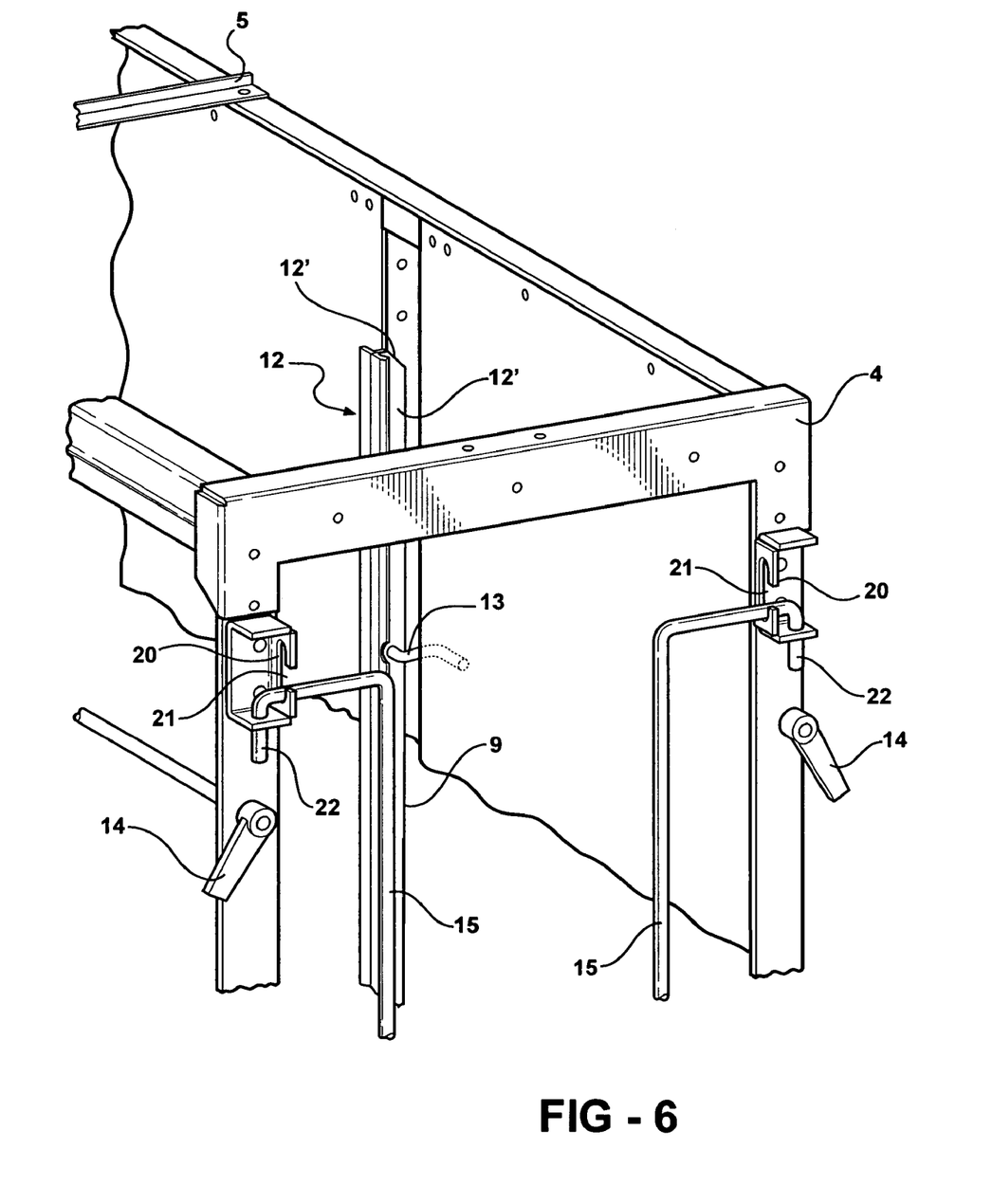
FIG. 6 is a perspective view of a portion of the front of the device of FIG. 1 which depicts one of the stop rails as being positioned so that it extends into the interior of the device.

FIG. 6 is a perspective view of a portion of the front of the device of FIG. 1 which depicts one of the stop rails 12 as being positioned so that it extends into the interior of the device. As shown, the stop rail 12 includes two elongated portions 12' that are symmetrically configured so that when they are coupled together they provided a generally T-shaped cross section with the opposite top edges of the "T" being bent downward as shown. FIG. 6 also depicts the crank-shaped portion of a rod member 13 extending into a through-hole provided in the stop rail 12.

FIG. 6 also shows the pivot rods 15 in their closed position and the details of the pivot brackets 16. As shown, the pivot brackets 16 include slots 20 which are configured to catch and secure the pivot brackets 15 against pivotal movement. The slots 20 have an open portion 21 through which the pivot rods 15 can pass to open the pivot rods 15. The ends of the pivot rods 15 are depicted as being secured by snap rings 22; however other means such as washer/cotter keys, press-fit caps, or other retainer or retaining means can be used. It is also possible to provide spring members on the ends of the pivot rods 15 between the snap rings 22 and the pivot brackets 16 to help retain the pivot rods 15 in their closed positions.

Figure 7:
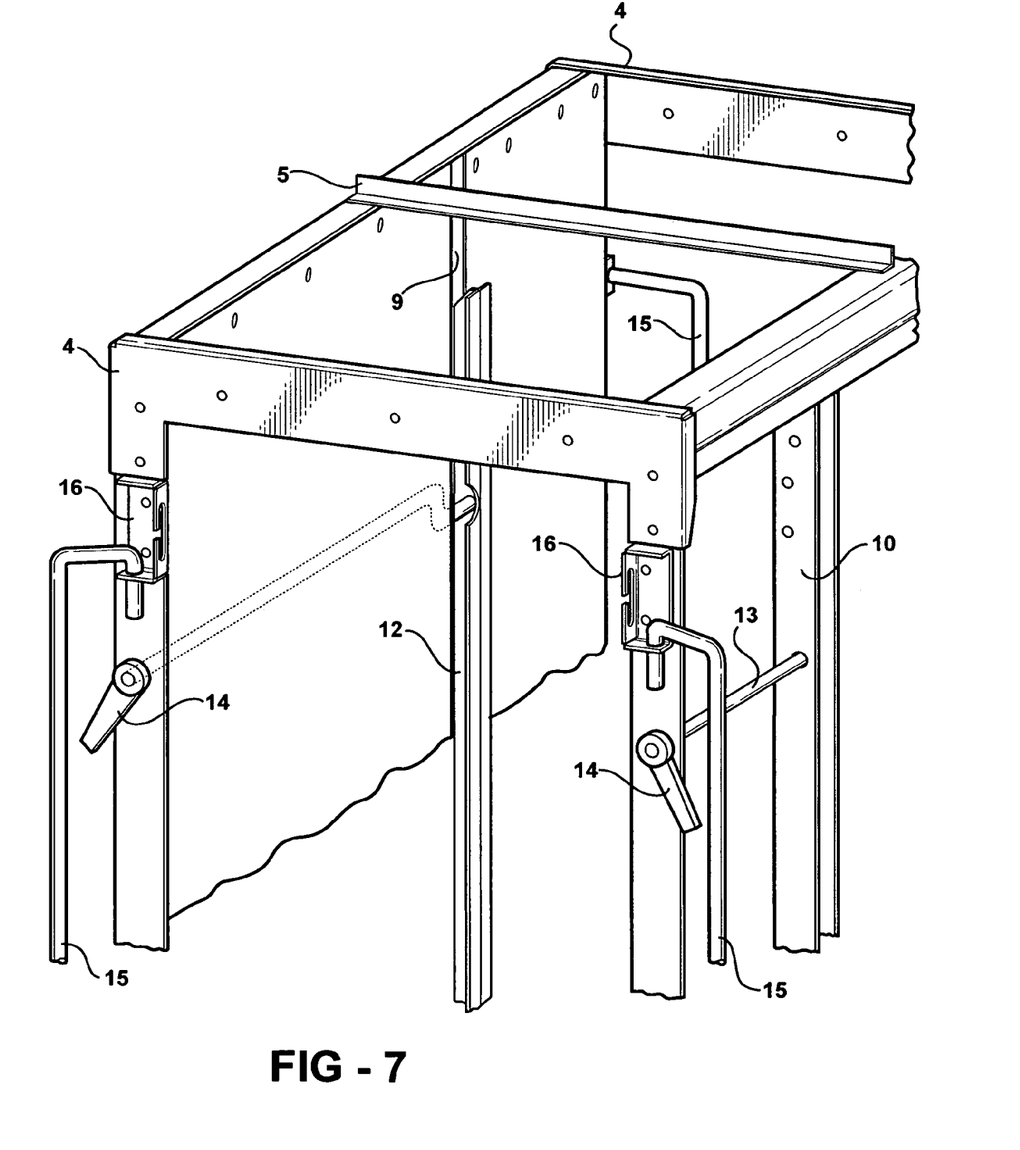
FIG. 7 is a perspective view of a portion of the front of the device of FIG. 1 which depicts another one of the stop rails as being positioned so that it extends into the interior of the device.

FIG. 7 is a perspective view of a portion of the front of the device of FIG. 1 which depicts one of the stop rails 12 as being positioned so that it extends into the interior of the device. In FIG. 7 a rear stop rail 12 is shown with a portion of the rod member 13 that extends to the rear 6 of the device visible. FIG. 7 also depicts the pivot rod members 15 in their open positions.

The device of the present invention operates as a flow through article storage device by allowing articles to be placed into the device from the rear side 6 and removed from the device from the front side 7. In a typical operation the front pivotal rods 15 are set into their closed position. Next, the rear stop rail 12 is moved so that it extends into the device, by rotating the handle 14 attached to the rear end of the associated rod member 13. A stack of articles is then loaded into the rear 6 of the storage device. Once the first stack of articles is loaded, the front stop rail 12 is moved so that it extends into the device, by rotating the handle 14 attached to the rear end 6 of the associated rod member 13. Next, the rear stop rail 12 is moved so that it does not extend into the device and the stack of articles is thereby released and moves under the influence of gravity toward the front 7 of the device along the sloped or inclined bottom 3' until the stack of articles abuts the front stop rail 12. At this stage the first loaded stack can either remain in place and a second stack of articles can be loaded behind it, or the first loaded stack of articles can be allowed to move to the front 7 of the device by positioning the front stop rail 12 so that it does not extend into the device and a second stack can be loaded after again moving the rear stop rail 12 is moved so that it extends into the device. Once the second stack is moved into the center of the device by moving the rear stop rail 12 so that it does not extend into the device, a third stack of articles can be loaded into the rear 6 of the device. Overall, from the above description it can be understood that manipulation of the stop rails 12 will allow selective holding of a loaded stack of articles and movement of a stack of articles abutting a given stop rail 12 by moving the stop rails 12 (rotating rod members 13) into and out of their abutment positions (in which the extend into the device). Therefore it can be understood that instead of moving one stack of articles from one position to the next, adjacent position, it is possible, for example, to move a stack of articles to either adjacent or subsequent positions by, in the illustrated embodiment, positioning both of the stop rails 12 so that they do not extend into the device. Once the device is fully loaded with articles, the rear pivot rods 15 are moved into their close positions.

Articles are removed from the device by opening the front pivot rods 15 and removing articles from the forward-most stack of articles. When the forward-most stack of articles is depleted, the stop rail 12 between the forward-most stack and the next-in-line stack of articles is moved so that it does not extend into the interior of the device, thereby allowing the next-in-line stack to move toward the front 7 of the device where the articles in the next in line stack can be removed. At the same time or thereafter the rear stop rail 12 can be moved so that it does not extend into the interior of the device, thereby allowing the following stack of articles to move into the position previously occupied by the next-in-line stack of articles.

The above description only describes an exemplary embodiment of the present invention. It is apparent that the overall construction of the device can take many forms using full, partial or no framework other than panel members. Likewise, the top of the device can be open or closed and the pivot rods can be replaced with any type of gate structure or door that is pivotal, slidable or removable. The legs can be angled and extend from the rear to the front of the device or otherwise comprise post-type legs. The device could have more than two stop rails so as to allow for storing and dispensing more than three stacks of articles. Other mechanisms could be provided to effect movement of the stop rails such as pivoting mechanisms having handles that can be pulled and locked which include rod members coupled to pivot arms that rotate the stop rails into and out of the interior of the device. Other modifications will be apparent to those skilled in the art, including the use of only one stop rail for handling two stacks of articles. Further it is to be understood that the articles do not have to be stacked, particularly if they are large.

While the general device was developed for used in vehicles such as trucks, vans, panel trucks and even trailers, it is within the scope of the present invention to scale-up the overall device (if desired) for use in fixed storage facilities such as warehouses. In such an application, the operation of the stop rails can be automated and/or computer controlled using any type of suitable driving motor, solenoid, or other electromechanical means. It is further possible in such embodiments to eliminate the connecting rods 13 and operate movement of the stop rails individually using remote switches or automated control means such as computer control. Such modifications can be implemented to scale up the general device to handle large articles and/or more that three stacks of articles and/or two or more parallel adjacent article flow paths that may reduce the amount of space required for the manually operable linkage of the stop rails. In such and embodiment, the stop rails can be positioned along only one or both sides of the device.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A flow through article storage device that comprises:
   a housing into which a plurality of stacks of articles can be positioned, said housing having a bottom a rectangular top, and a front, rear and opposite sides;
   a plurality of abutment elements that are coupled to the housing and configured for independent movement between a first position in which the abutment elements extend at least partially into the interior of the housing through the opposite sides and a second position in which the abutment members do not extend into the interior of the housing, said plurality of abutment elements having heights which extend from near the bottom of the housing to substantially near the top of the housing;
   at least one track of rollers provided interiorly in the housing upon which stacks of articles positioned in the housing can move toward the front of the device under the influence of gravity; and
   means for moving the abutment elements between the first and second positions to control the movement of stacks of articles position in the housing.

2. A flow through article storage device according to claim 1, wherein the means for moving the abutment elements comprises linkage mechanisms that are coupled to the plurality of abutment elements and extend to the front and rear of the housing for independent manipulation and control of movement of the abutment elements between the first and second positions.

3. A flow through article storage device according to claim 2, wherein the abutment elements comprise elongate abutment elements.

4. A flow Through article storage device according to claim 2, wherein the linkage mechanisms include handles at the opposite ends of the housing for manually operating the linkage mechanisms.

5. A flow through article storage device according to claim 1 further comprising closures at the front and rear of the housing.

6. A flow through article storage device according to claim 5 wherein the closures comprise gate elements.

7. A flow through article storage device according to claim 1 wherein the bottom of the housing is inclined downward from the rear to the front and the at least one track of rollers is provided on the inclined bottom.

8. A flow through article storage device according to claim 6, wherein the elongate abutment elements are perpendicular to the bottom of the housing.

9. A flow through article storage device according to claim 1, wherein the housing comprises at least one of panel and frame members.

10. A flow through article storage device according to claim 1, wherein the housing includes openings in the opposite sides through which the elongate abutment elements extend when moved into their first positions.

11. A flow through article storage device according to claim 1, wherein the plurality of elongate abutment elements comprises two or more elongate abutment elements.

12. The flow through article storage device in accordance with claim 1 in combination with a vehicle wherein the flow through article storage device is provided within the vehicle.

13. A method of controlling the transport of a plurality of articles to a supply site at which the articles can be distributed which comprises:

providing an inclined support along which the plurality of articles can move under the influence of gravity, said support including a housing having a bottom and a rectangular top;

providing a plurality of blocking elements that can be selectively moved into and out blocking positions which extend over a portion of the inclined supnort, said plurality of blocking elements having heights which extend from near the bottom of the housing to substantially near the top of the housing;

arranging the plurality of articles in stacks on the inclined support; and manipulating the plurality of blocking elements so as to sequentially move the plurality of stacks of articles down the inclined support.

14. A method of controlling the transport of a plurality of articles to a supply site according to claim 13, wherein the plurality of blocking elements arc manually manipulated so as to sequentially move the plurality of stacks of articles down the inclined support.

15. A method of controlling the transport of a plurality of articles to a supply site according to claim 13, wherein the plurality of blocking elements are manipulated at opposite ends of the inclined support.

16. A method of controlling the transport of a plurality of articles to a supply site according to claim 13, wherein the plurality of articles are transported within a vehicle.

17. A method of controlling the transport of a plurality of articles to a supply site according to claim 13, wherein the plurality of blocking elements are arranged on opposite sides of the inclined support.

18. A method of controlling the transport of a plurality of articles to a supply site according to claim 13, further comprising providing a closure at at least a lower end of the inclined support surface and manipulating the closure to prevent the articles from coming off the inclined support surface.

19. A method of controlling the transport of a plurality of articles to a supply site according to claim 13, further comprising providing at least a track of rollers on the inclined support surface.

20. A method of controlling the transport of a plurality of articles to a supply site according to claim 13, wherein the plurality of blocking elements are manipulated to move one stack of articles at a time.

* * * * *